US006419862B2

(12) United States Patent
Funakoshi (10) Patent No.: US 6,419,862 B2
(45) Date of Patent: Jul. 16, 2002

(54) METHOD FOR THE PRODUCTION OF AN EXPANDED FIBER-REINFORCED THERMOPLASTIC RESIN MOLDING

(75) Inventor: Satoru Funakoshi, Kameoka (JP)

(73) Assignee: Sumitomo Chemical Co., Ltd., Osaka (JP)

(*) Notice: Subject to any disclaimer, the term of this patent is extended or adjusted under 35 U.S.C. 154(b) by 0 days.

(21) Appl. No.: 09/888,653

(22) Filed: Jun. 26, 2001

(30) Foreign Application Priority Data

Jul. 27, 2000 (JP) .......................................... 2000-226678

(51) Int. Cl.[7] .............................................. B29C 44/06
(52) U.S. Cl. .................... 264/45.3; 264/45.5; 264/46.4; 264/50; 264/155
(58) Field of Search ........................... 264/45.3, 45.5, 264/46.4, 50, 154, 155

(56) References Cited

U.S. PATENT DOCUMENTS

| 4,910,067 A | * | 3/1990 | O'Neill ........................ 428/139 |
| 5,252,269 A | * | 10/1993 | Hara et al. .................. 264/45.3 |
| 5,292,465 A | * | 3/1994 | Kobayashi et al. ......... 264/45.5 |
| 5,843,568 A | * | 12/1998 | Masui et al. ............... 428/317.9 |
| 6,129,870 A | * | 10/2000 | Hettinga ..................... 264/40.5 |
| 6,146,562 A | * | 11/2000 | Hettinga ..................... 264/45.5 |
| 6,165,395 A | | 12/2000 | Kieras et al. |
| 6,165,396 A | * | 12/2000 | Sato et al. .................. 264/45.3 |

OTHER PUBLICATIONS

Patent Abstracts of Japan, "Fiber Reinforced Thermoplastic Resin Foamed Molded Object and Production Thereof", Koji et al., Publ. No. 07–016933, Date: Jan. 1995.
Patent Abstracts of Japan, "Gas Injection Molding Method for Fiber Reinforced Resin and Molded Product", Manabu et al., Publ. No. 10–305462, Date: Nov. 1998.
Patent Abstracts of Japan, "Manufacture of Foamable Fiber –Reinforced Resin Molded Item", Tatsuya et al., Publ. No. 10–296772, Date: Nov. 1998.
Patent Abstracts of Japan, "Injection Molding of Foamable Plastic Composition", Michio et al., Publ. No. 08–300391, Date: Nov. 1996.
Patent Abstracts of Japan, "Method for Producing Fiber Reinforced Thermoplastic Resin Expanded Molded Object", Publ. No. 2000–254932, Date: Sep. 2000.

\* cited by examiner

Primary Examiner—Allan R. Kuhns
(74) Attorney, Agent, or Firm—Fitch, Even, Tabin & Flannery (57) ABSTRACT

The present invention provides a method for producing an expanded fiber-reinforced thermoplastic resin molding, the method using a mold comprising a female and male dies and comprising processes for supplying a molten thermoplastic resin containing reinforcing fibers whose average fiber length is maintained at 1 mm or more to between the female and male dies to charge a mold cavity with the molten thermoplastic resin, opening a part or the whole of the mold in the thickness direction of a molding after the charging, and cooling a molding while maintaining a cavity clearance at the thickness of a final molding, the method wherein the mold cavity of the mold is interconnectable to the atmosphere, the method further comprising steps for (a) forming a solidified layer in the surface of the molten thermoplastic resin charged in the mold cavity, followed by (b) breaking at least a part of the solidified surface layer, introducing the air through the broken part concurrently with or after the breakage, and opening a part or the whole of the mold concurrently with the introduction of the air so that a cavity clearance defined there reaches the thickness of the final molding.

7 Claims, 5 Drawing Sheets

METHOD FOR THE PRODUCTION OF AN EXPANDED FIBER-REINFORCED THERMOPLASTIC RESIN MOLDING

BACKGROUND OF THE INVENTION

1. Field of the Invention

The present invention relates to a method for the production of an expanded fiber-reinforced thermoplastic resin moldings.

2. Description of the Related Art

Heretofore, fiber-reinforced thermoplastic resin moldings that are reinforced with reinforcing fibers and have voids formed therein are well known as light-weight and high-strength moldings. As a method for producing such moldings, there are known, for example, a method in which a long-fiber-containing molten thermoplastic resin is charged in a mold by injection and the mold is opened by a predetermined stroke concurrently with or just before the completion of the charge, thereby foaming the inside of the resin by spring-back of the long fibers (JP 10-296772, A); and a method in which a molten thermoplastic resin containing fibers for reinforcement 2–100 mm in length is injected into a mold that can move forward and backward, a movable mold is retracted until the cavity becomes to have a volume of a molding with the injection of gas into the molten thermoplastic resin, whereby the molten thermoplastic resin is expanded by spring-back of the fibers for reinforcement (JP 10-305462, A).

However, there are problems with the former method that mold transferability is poor because the force that presses the molding against the molding surface of the mold during foaming of the long-fiber-containing molten thermoplastic resin by the spring-back force is weak or products with high expansion ratios are difficult to be obtained since the foaming is occurred only by the spring-back force. In the latter method, the pressure of the gas injected improves the mold transferability. However, there are problems with the method that an apparatus for injecting a high-pressure gas is required or it is difficult to reduce the weight of the moldings since a gas leak must be prevented by thickening a skin layer.

SUMMARY OF THE INVENTION

Under these circumstances, the inventors of the present invention studied a method for producing a high-strength expanded fiber-reinforced thermoplastic resin molding excellent in light-weight property and mold transferability.

That is, the present invention provides a method for producing an expanded fiber-reinforced thermoplastic resin molding, the method using a mold comprising a female and male dies and comprising processes for supplying a molten thermoplastic resin containing reinforcing fibers whose average fiber length is maintained at 1 mm or more to between the female and male dies to charge a mold cavity with the molten thermoplastic resin, opening a part or the whole of the mold in the thickness direction of a molding after the charging, and cooling a molding while maintaining a cavity clearance at the thickness of a final molding, the method wherein the mold cavity of the mold is interconnectable to the atmosphere, the method further comprising steps for (a) forming a solidified layer in the surface of the molten thermoplastic resin charged in the mold cavity, followed by (b) breaking at least a part of the solidified surface layer, introducing the air through the broken part concurrently with or after the breakage, and opening a part or the whole of the mold concurrently with the introduction of the air so that a cavity clearance defined there reaches the thickness of the final molding, thereby making the internal unsolidified molten thermoplastic resin expand.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE PREFERRED EMBODIMENTS

The present invention is described below in detail.

The following are examples of the present invention and the invention is not limited thereto.

EXAMPLES

Figures 1A, 1B:
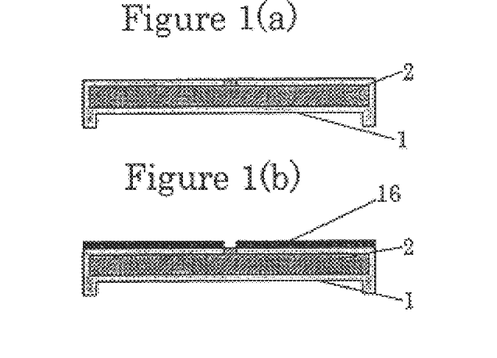
FIG. 1 is a schematic cross sectional view of an expanded fiber-reinforced thermoplastic resin molding of the present invention wherein (a) shows the case where a skin material is laminated and (b) shows the case where no skin material is laminated.

The expanded fiber-reinforced thermoplastic resin molding which is the object of the present invention is, as illustrated in FIG. 1 by a cross section along the thickness direction of the molding, composed of a skin layer (a solidified surface layer) (1) having almost no voids and an expanded layer (2) having voids (FIG. 1a) or has a structure in which a skin material (16) is laminated on the surface of a skin layer if desired (FIG. 1b).

In achieving light-weight and high-strength, it is important for the expanded layer (2) to have a beam-supported structure in which the reinforcing fibers are intertwined complicatedly with each other and the fibers are firmly fixed to each other with the thermoplastic resin in the vicinity of their contacts. In order to make the reinforcing fibers intertwined complicatedly with each other, it is necessary that the reinforcing fibers in a molding have an average length of 1 mm or more. If an average fiber length is less than 1 mm, desired performance maynot be obtained.

From such a viewpoint, in the method of the present invention, it is necessary to supply a molten thermoplastic resin containing reinforcing fibers whose average fiber length is maintained at 1 mm or more to a mold cavity.

As the average fiber length, a weight average fiber length, which is a general index, is used.

Since in the present invention it is necessary for the reinforcing fibers in a molding to have an average length of 1 mm or more as previously described, the reinforcing fibers whose average length is maintained at 1 mm or more mean reinforcing fibers having such a length that the reinforcing fibers in a molding obtained have an average length of 1 mm or more. The "average length of reinforcing fibers" used in the following description has the same meaning as that described above.

A method for supplying such a molten thermoplastic resin containing reinforcing fibers whose average fiber length is maintained at 1 mm or more to a mold cavity may be one comprising supplying a molten resin to a cavity wherein the molten resin is obtained by melt-kneading reinforcing fibers having an average fiber length of 3 mm or more and thermoplastic resin granules or pellets in, for example, an injection unit having an in-line screw, or one comprising supplying a molten resin to a cavity wherein the molten resin is obtained by melt-kneading a pre-formed thermoplastic resin material containing reinforcing fibers having an average fiber length of 3 mm or more, for example, long-fiber-reinforced thermoplastic resin pellets.

In the latter method, the preferably employed as the long-fiber-reinforced thermoplastic resin pellets is what is obtained by impregnating glass roving with a molten thermoplastic resin, cooling and solidifying the resultant, and then cutting it into proper length, for example, about 3 to 25 mm to form pellets. Such long-fiber-reinforced thermoplastic resin pellets may be used alone or by being admixed with resin pellets comprising the matrix resin of the long-fiber-reinforcing thermoplastic resin for the adjustment of reinforcing fiber content, and also may be used by being mixed with other thermoplastic resin pellets.

As the reinforcing fiber to be used, various conventionally known reinforcing fibers such as glass fiber, carbon fiber and alumina fiber may be mentioned. Glass fibers are widely used as the most popular one.

As the thermoplastic resin to be used, any resin may be applied as long as it can be used in extrusion forming, injection molding, press molding and the like. For example, general thermoplastic resins such as polyethylenes, polypropylenes, polystyrenes, acrylonitrile-styrene-butadiene copolymers, polyvinyl chlorides, polyamides, polycarbonates and polyethylene terephthalates, mixtures thereof, or polymer alloys using these thermoplastic resins may be mentioned. The term "thermoplastic resin" used in the present invention includes all of these species.

Moreover, such thermoplastic resin may, as needed, contain fillers such as talc. Various additives conventionally used, such as pigments, lubricants, antistatic agents and stabilizers, may optionally be incorporated.

In such reinforcing fibers and thermoplastic resin, the greater the adhesion of the reinforcing fibers to the thermoplastic resin, the firmer the linkage of the fibers themselves through the matrix resin and the strength of expanded moldings is improved. Therefore, in the case of the combination: the matrix resin is a polypropylene-based resin and the reinforcing fibers are glass fibers, for example, it is effective to improve the adhesion by applying surface treatment to the glass fibers or incorporating a modifier to the polypropylene-based resin.

The content of the reinforcing fibers in the thermoplastic resin varies depending on the expansion degree of the desired expanded molding and the desired characteristics thereof, and generally is approximately from 10 to 80% by weight.

The production method of the present invention will be explained based on the drawings below.

Figure 2:
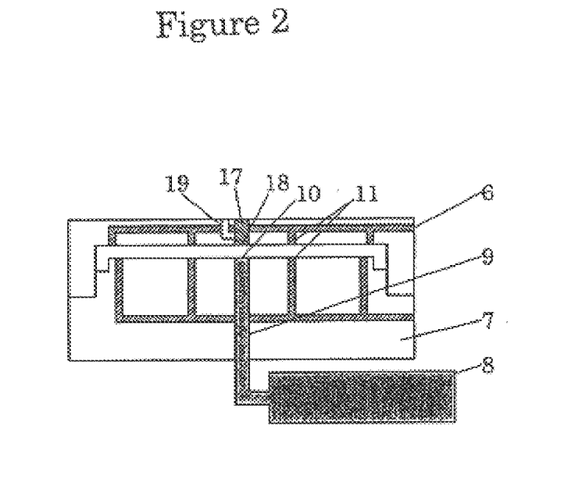
FIG. 2 is a schematic sectional view of a mold used for the production of an expanded fiber-reinforced thermoplastic resin molding of the present invention.

FIG. 2 illustrates the outline of an example of the mold to be used in the method of the present invention by its cross sectional view. The mold comprises a pair of a male die (7) and a female die (6), one of the dies being generally associated with a press device and being movable, another one being fixed, and the mold can be opened and closed vertically or horizontally. (In the drawing, the male die is fixed, the female die is movable, and the mold can be opened and closed vertically.)

Although a method to supply a molten thermoplastic resin containing reinforcing fibers (henceforth, may be referred, simply, to as a molten resin) to a mold cavity is optional, a method is usually employed by choice in which a resin supply opening (11), which is connected to a resin supply device (8) via a resin supply passage (9) dug in the mold, is provided in the molding surface of one or both of the female and male dies (in the drawing, the opening is provided in the molding surface of the male die), and the molten resin is supplied to the cavity through the resin supply opening.

In this case, it is also possible to design the mold so that a freely-operatable valve is provided in the resin supply passage in the vicinity of the resin supply opening and the supply of a molten resin accumulated in the resin supply device such as an injection unit and the stop thereof can freely be controlled.

The mold may have a suction opening (11), which opens to the cavity, provided to a molding surface of one or both of the female and male dies, and may be designed so that an expanded molding is attracted onto the molding surface by evacuation through the opening. Such evacuation is a preferred embodiment.

The suction opening (11) is connected to a evacuating device, which is not shown, such as a vacuum pump via a suction path and the suction path may be equipped with a valve capable of freely controlling suction and its stop and also may be equipped with a controlling mechanism for adjusting suction force, as needed.

The suction opening (11) opens in a molding surface of the mold and also may be such fine pores that a molten resin cannot enter. Moreover, it may also be a crack in the juncture of parts constituting the mold, generally called the parting line. Alternatively, the mold may be constituted in part or in approximately whole of porous metal having gas permeability.

Moreover, the mold may have a structure where one or both of the female and male dies have a portion that interconnects the inside and the outside (the atmosphere) of the cavity and the air is introduced to the cavity through the portion.

The interconnecting portion may be an opening hole (18) formed in the molding surface of the mold and also may be a pin-like part having an opening hole. Alternatively, the periphery portion of the mold cavity may be utilized as the interconnecting portion.

Figure 14:
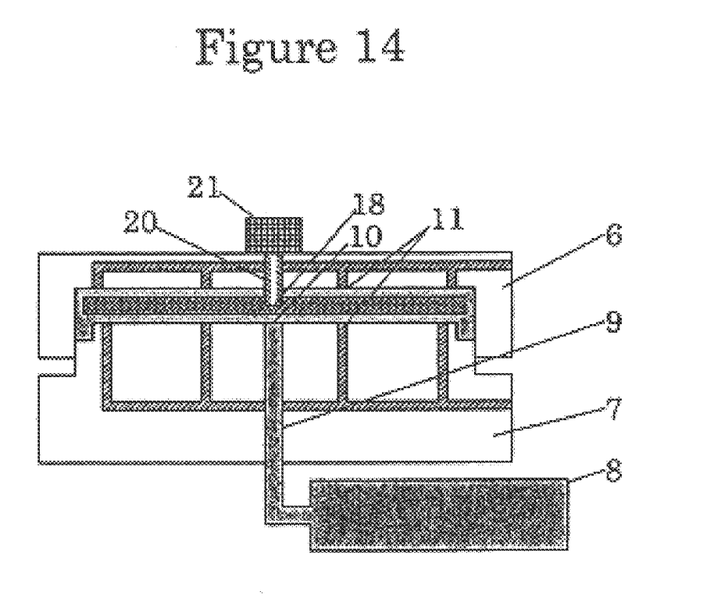
FIG. 14 is a schematic sectional view of a mold used for the production of an expanded fiber-reinforced thermoplastic resin molding of the present invention.

For example, in the case where an opening hole (18) is provided in the molding surface of the mold, the opening hole (18) is opened to the atmosphere via an air channel (19) provided in the mold. To the opening hole (18), a valve (17) for opening and closing the opening hole, which can freely control the opening and closure of the opening hole, may be provided. Moreover, a controlling mechanism for adjusting the opening area of the opening hole may also be provided, as needed. When the pin-like part (20) having an opening hole is used, the opening hole leads to the atmosphere and the pin-like part is associated with a driving unit (21) such as an air cylinder so as to be moved forward and backward relative to the molding surface of the mold (FIG. 14).

Figure 12:
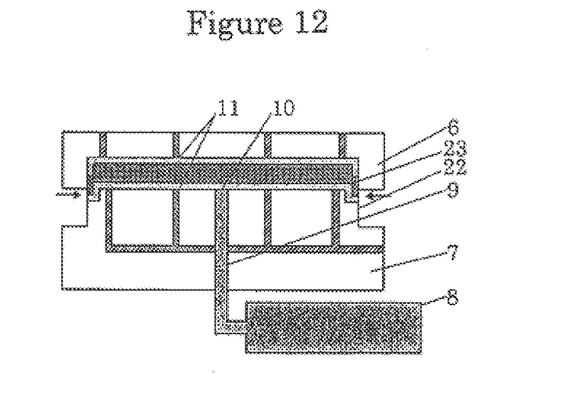
FIG. 12 is a schematic sectional view of a mold used for the production of an expanded fiber-reinforced thermoplastic resin molding of the present invention.

In the embodiment utilizing the periphery portion of the mold cavity, the slide surfaces (22) of the female and male dies may be designed to be short so that no overlap of the slide surfaces occurs in the state where the cavity clearance is opened to the thickness of the final molding (FIG. 12). When the overlap of the slide surfaces is eliminated, the cavity can be interconnected with the atmosphere.

In this case, it is preferable to set the clearance between the slide surfaces of the dies from about 0.05 to 1 mm.

In the case where the mold to be used is one of the bumping type having no slide surfaces, a clearance is formed between the dies that were in the bumping state and the air can be introduced into the cavity through the clearance. (FIG. 13) By the use of such a mold, a molten resin (12) is charged between the female and male dies.

The temperature of the molten resin to be used varies depending on the type of heat and molding conditions, and on the type of a skin material to be used when a skin material is used, and is set to an optimum temperature. For example, when a glass fiber-reinforced resin containing a polypropylene-based resin as a matrix is used, the temperature of the resin is about 170 to 300° C., preferably about 200 to 280° C.

The charge of the molten resin (12) to the mold cavity may be conducted by either injection charging or closing the female and male dies. The way of charging the molten resin may optionally be selected depending on the desired product form.

Figure 3:
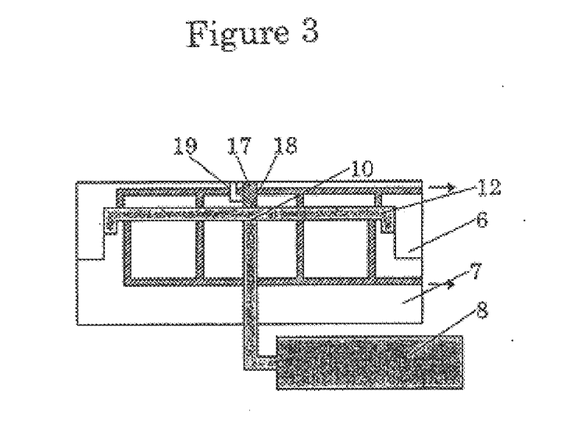
FIG. 3 is a schematic sectional view of a mold used for the production of an expanded fiber-reinforced thermoplastic resin molding of the present invention.
Figure 4:
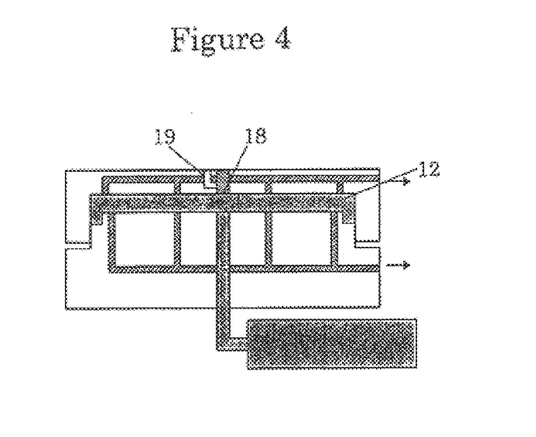
FIG. 4 is a schematic sectional view of a mold used for the production of an expanded fiber-reinforced thermoplastic resin molding of the present invention.

The former method by injection charging may be exemplified by a method in which the supply of a molten resin is commenced with both dies positioned so that the cavity clearance is less than the thickness of a molding before expansion (FIG. 3), the mold is opened concurrently with the supply of the molten resin, whereby the molten resin is charged in the cavity so that the cavity clearance becomes, at the same time when the supply of the molten resin is completed resin, equal to the thickness of the molding before expansion (FIG. 4), and a method in which the molten resin is supplied with both dies positioned so that the cavity clearance equal to the thickness of the molding before expansion is defined, whereby the molten resin is supplied and charged in the cavity.

The latter method by the clamping of both dies may be exemplified by a method in which the supply of a molten resin to between the dies is commenced with the cavity clearance between the female and male dies held greater than the thickness of the molding before expansion and the mold is closed concurrently with or after the supply of the molten resin until the cavity clearance reaches the thickness of the molding before expansion, whereby the molten resin is charged in the mold cavity.

In the former case by injection charging wherein the supply of the molten resin is commenced with the dies positioned so that the cavity clearance is less than the thickness of the molding before expansion, the cavity clearance defined at the time of the supply commencement ranges, in terms of a cavity volume, usually not less than 5% by volume and less than 100% by volume, preferably not less than 30% by volume and not greater than 70% by volume, based on the volume of a predetermined quantity of molten resin before expansion.

When the supply of the molten resin is commenced in such a state, the movable die retreats so that the cavity clearance is enlarged with the proceeding of the supply of the molten resin. On completing the supply of the molten resin of a predetermined quantity, the volume of the molten resin supplied becomes approximately equal to the capacity of the cavity and the molten resin is charged in the cavity.

In such a step, the enlargement of the cavity clearance may be controlled by the mechanical retreat of the die by using a press unit or the like associated with the mold. The cavity clearance may alternatively be enlarged by utilizing the supply pressure of the molten resin to be supplied. In any case, it is preferable that the enlargement is controlled so that the pressure applied to the resin would become about 1 to 50 MPa.

In the enlargement process of the cavity clearance, care must be taken that the cavity volume does not exceed the volume of the molten resin supplied. However, no special problem arises even when the cavity volume exceeds the volume of the molten resin supplied, if it occurs instantaneously or in a very short time.

Moreover, in the case of the injection charging, the method in which the supply of a molten resin is commenced with both dies positioned so that the cavity clearance is equal to the thickness of a molding before expansion only requires that the cavity clearance of the mold is maintained at the thickness of the molding before expansion from the beginning to the completion of the supply of the molten resin, as in the ordinary injection molding.

Figure 7:
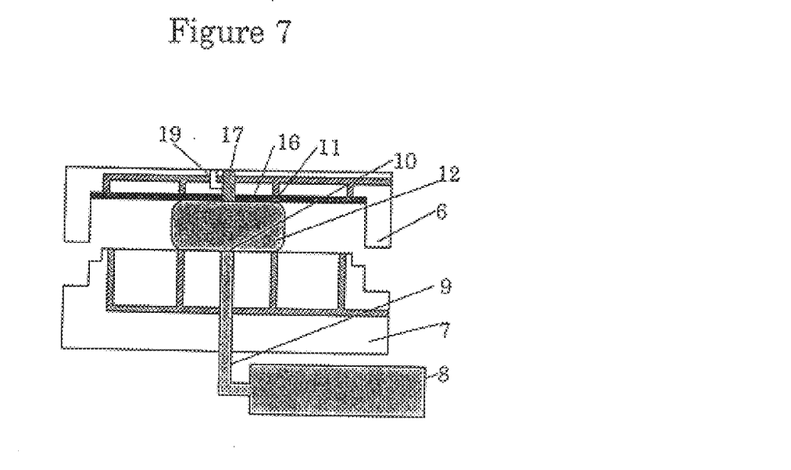
FIG. 7 is a schematic sectional view of a mold used for the production of an expanded fiber-reinforced thermoplastic resin molding of the present invention.
Figure 8:
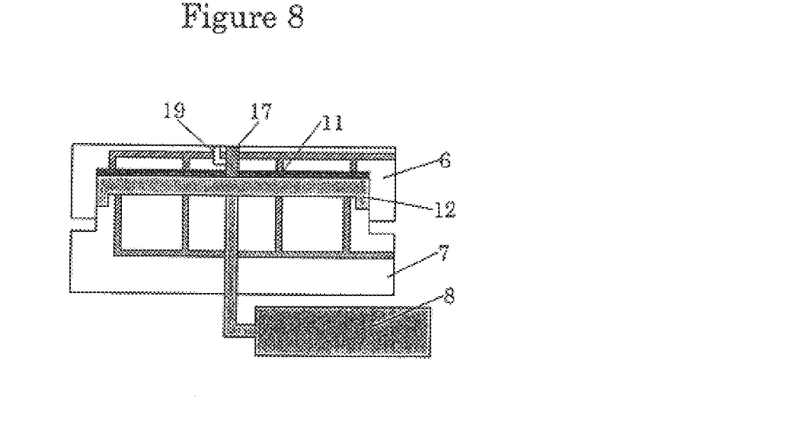
FIG. 8 is a schematic sectional view of a mold used for the production of an expanded fiber-reinforced thermoplastic resin molding of the present invention.

When the molten resin is charged in the cavity by the clamping of the dies, possible methods include one in which a predetermined quantity of molten resin is supplied into a mold cavity defined by both dies opened so that the cavity clearance is not smaller than the thickness of the molding before expansion and the dies are, after or at the same time as the supply is completed, closed so that the cavity clearance would coincide with the thickness of the molding before expansion, whereby the molten resin is charged; and a method in which the supply of the molten resin is commenced during the clamping of the mold, the supply of the molten resin and the clamping of the mold are conducted in parallel so that the cavity clearance would become equal to the thickness of the molding before expansion just on or after the completion of the supply of the molten resin. FIGS. 7 and 8 show such a method by the clamping of the mold by taking the case of laminating a skin material (16) as an example. When no skin material is laminated, the supply of the molten resin to between the female and male dies opened may be commenced in the same manner as that mentioned previously, without supplying a skin material between the dies in advance.

Of these methods, in the case of injection charging where the supply of the molten resin is commenced with the dies positioned so as to define a cavity clearance less than the thickness of the molding before expansion, the narrower the cavity clearance at the time of supplying the molten resin, the better the surface appearance of the moldings obtained. However, when the cavity clearance is too narrow, the damage to the reinforcing fibers in the molten resin tends to be great. Therefore, the cavity clearance is properly determined depending on the thickness, size and shape of the molding.

On the other hand, in the case where the molten resin is charged by the clamping of the dies, since the pressure applied to the molten resin to be supplied becomes lower, the damage to the reinforcing fibers in the molten resin may be minimized, preventing the reduction of expandability or the reduction of strength.

Considering these facts, in general, the method by injection charging is useful when the external appearance of expanded moldings is important and the method by charging by the clamping of the mold is useful when expandability or strength is important.

The molten resin charged in the mold cavity by such methods is in a state where it involves approximately no voids or, in come cases, have only slight voids. (i.e. The state means "almost no voids".)

A skin layer (1) is caused to form in the surface of the molten resin in such a state. Since the temperature of the mold is generally set to be lower than that of the molten resin, the molten resin begins to solidify from its surface portion in contact with a molding surface of the mold and a skin layer having approximately no voids or only slight voids is formed during an optional cooling time.

The cooling time has a large effect on the formation of a skin layer. The longer the cooling time, the easier the formation of a skin layer and the thicker a skin layer becomes.

Furthermore, there is a general tendency that when a skin layer becomes too thick, an expansion ratio obtained by the following mold opening decreases, whereas when the skin layer becomes too thin, the strength is deteriorated. Therefore, the thickness of the skin layer is properly selected depending on the expansion ratio or strength of an expanded molding desired. In general, each skin layer has such a thickness that the total thickness of the front and rear skin layers is 5 to 20% of the thickness of the expanded molding.

To that end, the cooling time, that is, the time interval between the completion of the charging of the molten resin in the cavity and the opening of the mold in the next step may vary depending on various conditions such as the mold temperature, the temperature of the molten resin supplied and the type of the resin, and is generally about 0.1 to 20 seconds.

It is preferable that in the course of or after the formation of the skin layer, suction is performed through a suction opening (11) provided in the mold, whereby the skin layer formed in the surface of the molten resin is attracted onto the molding surface of the mold.

Figure 5:
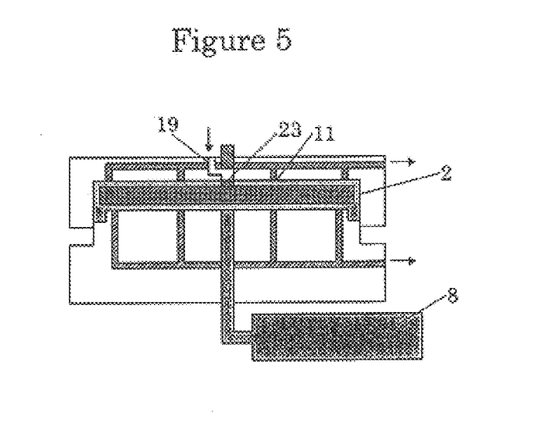
FIG. 5 is a schematic sectional view of a mold used for the production of an expanded fiber-reinforced thermoplastic resin molding of the present invention.

When the mold is opened in the thickness direction of the molding with the skin layer attracted onto the molding surface of the mold, a portion still in an unsolidified state in the molten resin supplied expands through the action of the restoring force of the reinforcing fibers, whereby voids are formed and, concurrently with this, an expanded layer is formed (FIG. 5).

If the mold is opened in the thickness direction of the molding with the skin layer attracted onto the molding surface of the mold, the reinforcing fibers may be expanded with stronger restoring force than that applied when the skin layer is not attracted.

At this time, when the cavity is interconnected with the atmosphere, the part exposed to the atmosphere of the skin layer previously formed leaves the molding surface of the mold and the skin layer (23) in this part is gradually softened again by the heat of the molten resin whose inside is still in the unsolidified state.

For example, in the case where the cavity is interconnected with the atmosphere through an opening hole (18) provided in the molding surface of the mold, the opening hole is kept closed until a skin layer (1) is formed in the surface of the molten resin and it is opened after the skin layer has been formed, or the opening hole is opened at the same time as the opening of the mold in the thickness direction of a molding is commenced.

Figure 13:
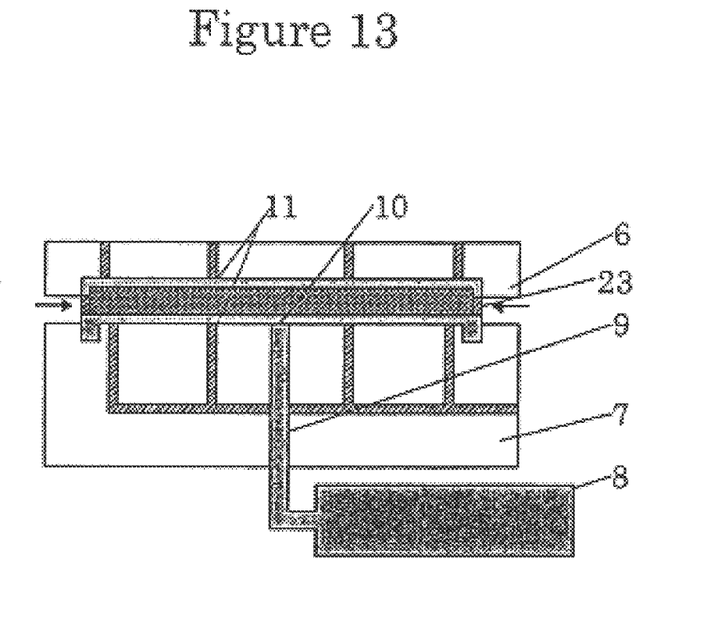
FIG. 13 is a schematic sectional view of a mold used for the production of an expanded fiber-reinforced thermoplastic resin molding of the present invention.

Furthermore, in the case where the interconnection of the cavity with the atmosphere is established at the periphery of the cavity of the mold, the overlap of the slide surfaces (22) of the dies is eliminated (FIG. 12) or a clearance is formed between the dies abutted by the slight opening of the mold. This establishes a state where the cavity and the atmosphere are interconnected at the opened portion (FIG. 13).

In the case of using a pin-like part (20) having an opening hole, a skin layer may be broken forcefully by keeping the pin-like part retreated in the mold until the skin layer is formed in the surface of the molten resin and advancing it so as to pierce the skin layer after the formation of the skin layer (FIG. 14).

A skin layer (23) partially softened is broken with the opening of the mold, whereby the air is taken into the unsolidified molten resin through the broken portion (FIG. 5).

When the pin-like part is advanced to pierce the molding, the air is taken into the molten resin through the opening hole formed in the pin-like part.

When the mold is opened while the air is taken into the unsolidified molten resin, the pressure inside the molten resin becomes negative and the inhibition of the restoring force of the reinforcing fibers is prevented, resulting in expansion with a high expansion ratio (FIG. 5).

This results in an expanded molding having a beam-supported structure in which reinforcing fibers are oriented along the mold-opening direction, that is, the thickness direction of the expanded molding.

To improve the mold-transferability of moldings, the mold must be opened with the skin layer formed in at least one surface of the molten resin charged in the cavity in firmly contact with the molding surface of the mold.

To that end, for example, in the case where one surface of the expanded molding as a product becomes a designed surface, it is preferable that a suction opening is provided in at least the molding surface of the die located in the side where the designed surface is formed and the mold is opened while being evacuated through the suction opening, whereby the mold is opened with the skin layer attracted onto the molding surface of the mold.

Furthermore, in the case where both surfaces of an expanded molding become designed surfaces, it is preferable that suction openings are provided in the molding surfaces of both dies and the mold is opened while being evacuated through both suction openings, whereby the mold is opened with the skin layers in both surfaces of the molding attracted onto the molding surfaces of the dies.

It is preferable that the opening motion of the mold is positively controlled by an opening unit installed in the mold itself, a press unit mounted to the mold, or the like.

As for the timing of the commencement of the suction from the molding surface of the mold, although it is general that the suction is performed after a skin layer is formed in the surface layer of the molten resin charged in the cavity, the suction may, in some cases, be commenced in the step of charging the molten resin in the cavity or during cooling step for forming a skin layer.

When the cavity clearance becomes the thickness of the final expanded molding, the opening motion of the mold is stopped and the molding is cooled while the cavity clearance is kept at that thickness (FIG. 5).

The suction operation is preferably continued until the cooling is completed.

In some cases, there may also be taken an embodiment wherein the cavity clearance is opened in the aforementioned opening motion so as to be greater than the thickness of the final expanded molding and then the mold is closed until the cavity clearance reaches the thickness of the final expanded molding before the molten resin supplied has completely solidified and while at least its center portion in its thickness direction is still in the molten state, thereby re-compressing the resin.

In this case, the skin layer in the surface of the molten resin supplied and the molding surface of the mold may be made come more closely into contact and the shape of the mold may be reproduced more faithfully.

Figure 6:
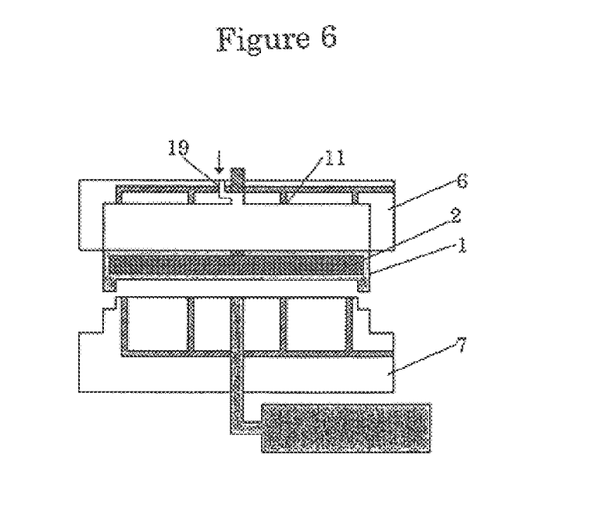
FIG. 6 is a schematic sectional view of a mold used for the production of an expanded fiber-reinforced thermoplastic resin molding of the present invention.

When the cooling has been completed, the suction operation is stopped and the mold is completely opened, and the final molding, an expanded fiber-reinforced thermoplastic resin molding is removed from the mold (FIG. 6).

Expanded fiber-reinforced thermoplastic resin moldings may easily be produced by such methods. When a mold having a structure in which a part of the mold can be locally moved is used in such methods, expanded fiber-reinforced thermoplastic resin moldings locally having an expanded portion may be produced.

Figure 9:
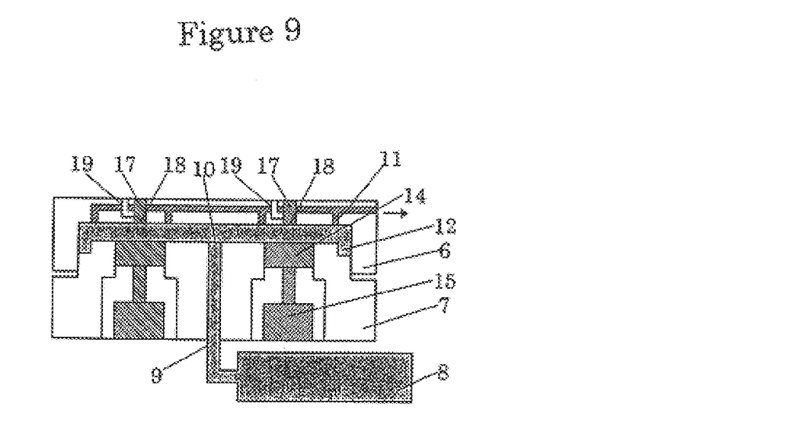
FIG. 9 is a schematic sectional view of a mold used for the production of an expanded fiber-reinforced thermoplastic resin molding of the present invention.

When such an expanded fiber-reinforced thermoplastic resin molding locally having an expanded portion is produced, a mold may be used, for example, in which a part of the mold as shown in FIG. 9 is composed of a movable-molding-surface-forming member such as a slide core (14), and the slide core occupying a part of the molding surface of the mold can be locally moved in the mold open-and-close direction independently from the mold by a molding-surface-moving device such as a hydraulic cylinder (15).

Figure 10:
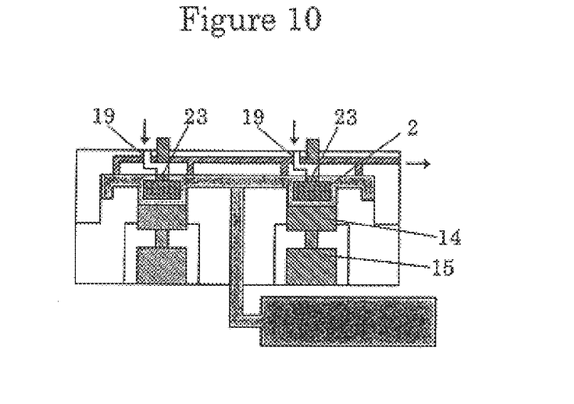
FIG. 10 is a schematic sectional view of a mold used for the production of an expanded fiber-reinforced thermoplastic resin molding of the present invention.
Figure 11:
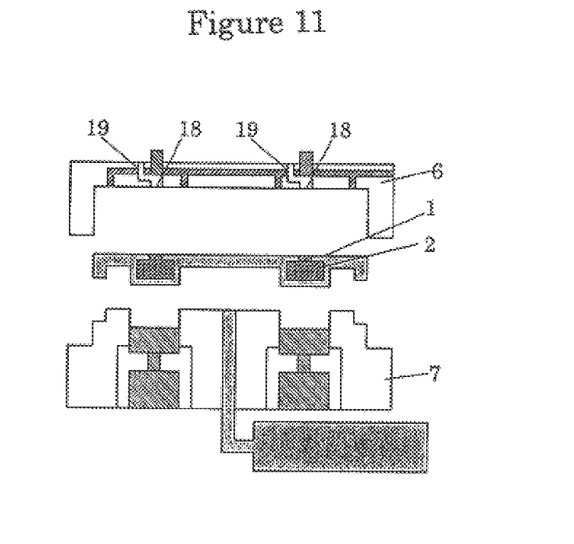
FIG. 11 is a schematic sectional view of a mold used for the production of an expanded fiber-reinforced thermoplastic resin molding of the present invention.

In this case, the level of the molding surface of the slide core (14) is, in advance, adjusted to that of the molding surface of the mold, whereby a mold cavity is formed. A molten resin is then supplied in the aforementioned manner to be charged in the cavity. After that, the slide core (14) is moved in such a direction that the thickness increases with a skin layer attracted onto the molding surface as shown in FIGS. 10 and 11, whereby an expanded layer is formed in this portion, and then cooling is performed. This easily results in an expanded fiber-reinforced thermoplastic molding locally having an expanded portion where the slide core is positioned.

In this case, it is preferable that an opening hole (18) or a pin-like part (20) having an opening hole is provided in a slide core located in the area where the cavity and the atmosphere are interconnected together or in the area of the molding surface which faces the slide core.

Moreover, in the case where what is required is a skin material-integrated expanded molding that is an expanded fiber-reinforced thermoplastic resin molding wherein a part or the whole of its surface is covered with a skin material (16) laminated, it may be produced by the aforementioned method wherein the skin material (16) is, in advance, placed on a molding surface of the mold so as to cover a part or the whole of the molding surface, a molten resin is supplied and charged to between the skin material and the molding surface of the mold, and then suction and mold opening are performed according to the aforementioned method. Depending on the type of the skin material used, a method may be preferable in which the supply of the molten resin to between the dies unclosed is commenced and then it is charged in the cavity by the clamping of the mold (FIGS. 7–8).

Examples of the skin material to be used includes those generally used as a skin material, such as sheets or films of various kinds of thermoplastic resins or thermoplastic elastomers, foamed sheet of thermoplastic resins or thermoplastic elastomers, non-woven fabrics, fabrics and matters combining these materials.

Furthermore, when a skin material is used, a skin layer may be difficult to be formed in the surface of a molten resin with a skin material laminated thereon. In such a case, a method may also be employed in which a skin material impermeable to gas is used and the skin material stuck with a molten resin is regarded as a skin layer and is attracted onto the molding surface of the mold.

In the methods previously described, a skin layer formed may be difficult to be broken depending upon the type of the thermoplastic resin or reinforcing fibers to be used or the content of the reinforcing fibers. In such cases, premixing of a foaming agent to the raw material, the molten resin, is effective since a solidified layer becomes easy to be broken by the pressure caused through the blowing-out of the gas generated from the foaming agent in the mold.

A slight amount as small as 0.01 to 5% by weight relative to the resin components contained in the raw material, the thermoplastic resin containing reinforcing fibers, may be enough for the quantity of the foaming agent to be used for that purpose.

Injection of a compressed gas into a molten resin through a gas injection opening or a resin supply opening provided in the molding surface of the mold may support the breakage of the solidified layer.

The method of the present invention can easily produce expanded fiber-reinforced thermoplastic resin moldings with high expansion ratios and excellent in light-weight property, high-strength and surface transferability. The expanded moldings obtained by such a method in the form of light-weight, high-strength moldings may be widely used in various fields as interior materials, exterior materials or structural materials in the automotive field or the building material field, or for household electrical appliances.

What is claimed is:

1. A method for producing an expanded fiber-reinforced thermoplastic resin molding, the method comprising using a mold comprising female and male dies and comprising processes for supplying a molten thermoplastic resin containing reinforcing fibers whose average fiber length is maintained at 1 mm or more to between the female and male dies to charge a mold cavity with the molten thermoplastic resin, opening a part or the whole of the mold in the thickness direction of a molding after the charging, and cooling a molding while maintaining a cavity clearance at the thickness of a final molding, the method wherein the mold cavity of the mold is interconnectable to the atmosphere, the method further comprising steps for (a) forming a solidified layer in the surface of the molten thermoplastic resin charged in the mold cavity, followed by (b) breaking at least a part of the solidified surface layer, introducing air through the broken part concurrently with or after the breakage, and opening a part or the whole of the mold concurrently with the introduction of the air so that a cavity clearance defined there reaches the thickness of the final molding, thereby making the internal unsolidified molten thermoplastic resin to expand.

2. The method for producing an expanded fiber-reinforced thermoplastic resin molding according to claim 1, wherein the step (b) includes opening a part or the whole of the mold in the thickness direction of the molding until the cavity clearance defined there reaches the thickness of the final molding concurrently with evacuating through a suction opening provided in the molding surface of one or both of the female and male dies.

3. The method for producing an expanded fiber-reinforced thermoplastic resin molding according to claim 1, wherein the step (b) including opening a part or the whole of the mold in the thickness direction of the molding beyond the thickness of the final molding to expand the internal unsolidified molten thermoplastic resin and closing, after the expansion, a part or the whole of the mold so that the cavity clearance defined there reaches the thickness of the final molding, thereby compressing the molten thermoplastic resin.

4. The method for producing an expanded fiber-reinforced thermoplastic resin molding according to claim 1, wherein the broken part of the solidified surface layer is located in the vicinity of the outer periphery surface of a molding surface.

5. The method for producing an expanded fiber-reinforced thermoplastic resin molding according to claim 1, wherein the mold is one having an opening leading to the atmosphere and wherein at least in step (b) the opening is opened to break the solidified surface layer corresponding to the opening, thereby introducing the air therethrough.

6. The method for producing an expanded fiber-reinforced thermoplastic resin molding according to claim 1, wherein a foaming agent is contained in the raw material, the molten thermoplastic resin containing the reinforcing fibers, in the amount of from 0.01 to 5% by weight based on the thermoplastic resin.

7. The method for producing an expanded fiber-reinforced thermoplastic resin molding according to claim 1, wherein a skin material is supplied to between the female and male dies prior to the supply of the molten thermoplastic resin and the molten thermoplastic resin is supplied to between the skin material and the molding surface of any one of the female and male dies.

* * * * *